United States Patent [19]

Peters et al.

[11] Patent Number: 5,177,510
[45] Date of Patent: Jan. 5, 1993

[54] ALIGNMENT EYEGLASSES

[76] Inventors: J. Glenn Peters, P.O. Box 755; J. Ben Crawford, P.O. Box 468, both of, Louisville, Miss. 39339

[21] Appl. No.: 600,000

[22] Filed: Oct. 19, 1990

Related U.S. Application Data

[63] Continuation-in-part of Ser. No. 480,831, Feb. 16, 1990, abandoned, which is a continuation-in-part of Ser. No. 366,505, Jun. 13, 1989, abandoned.

[51] Int. Cl.⁵ .............................................. G02C 7/16
[52] U.S. Cl. ....................................... 351/45; 351/53
[58] Field of Search ...................... 351/45, 53, 49, 158

[56] References Cited

U.S. PATENT DOCUMENTS 1,247,853  11/1917  McWeinie ............... 351/45
2,378,493   6/1945  Miles ..................... 351/45
4,824,234   4/1989  Sparks et al. ............ 351/53

Primary Examiner—Rodney B. Bovernick
Attorney, Agent, or Firm—Cushman, Darby & Cushman

[57] ABSTRACT

Eyeglasses to aid a wearer, especially athletes or participants in sports, to diminish the input from his or her occulo-vestibular reflexes and provide immediate visual feedback concerning alignment while he or she is performing any motor coordinated skill or movement. More particularly, the eyeglasses have one or more substantially straight visible transparent lines on one or both of the eyepieces which appear to be superimposed on the view through the line or lines. Each line is substantially parallel to the horizontal or vertical axis of its eyepiece. This line or lines enable the wearer of the eyeglasses to readily check alignment of the body, head, hands and/or a held object with a viewed object, e.g. a golf ball, a pitched baseball, a bowling pin, a basketball, etc. and aid the wearer to make alignment corrections if necessary. The lines may be clear or tinted and defined by tinted areas formed by pigments penetrating to a very shallow depth from only one of the front and back surfaces of the corresponding eyepiece. A simplified process is presented for tinting those areas.

14 Claims, 2 Drawing Sheets

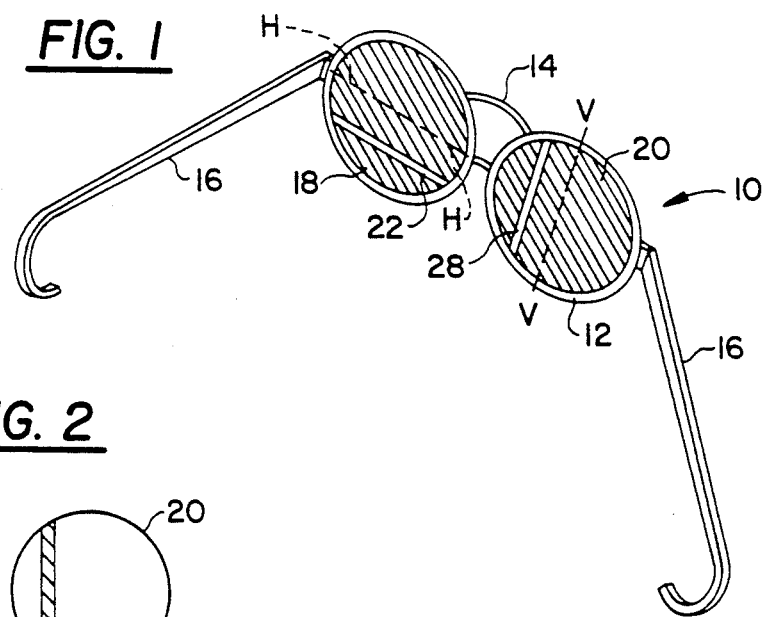
FIG. 1
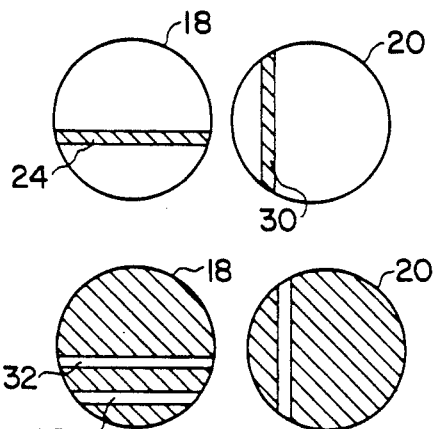
FIG. 2
FIG. 3
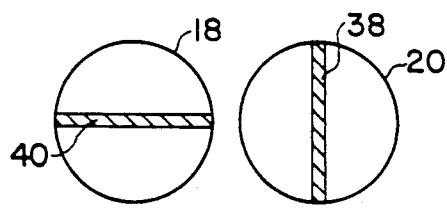
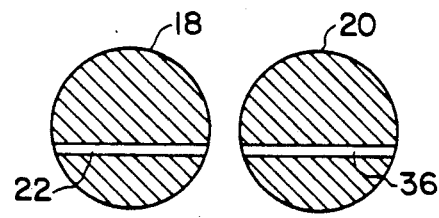
FIG. 4
FIG. 5
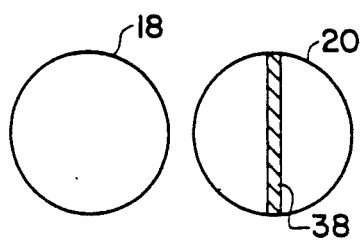
FIG. 6

ALIGNMENT EYEGLASSES

This application is a continuation-in-part of our co-pending application Ser. No. 07/480,831, filed Feb. 16, 1990 now abandoned, which was a continuation-in-part of our application Ser. No. 07/366,505, filed Jun. 13, 1989, now abandoned.

FIELD OF THE INVENTION

This invention relates to eyeglasses having left and right eyepieces that are equipped with indicia especially adapted to improve, for a wearer, the results of a motor coordination skill, that is, to aid the wearer in making correct alignments of head, body, arms or legs or of held implements, such as, for example, a basketball, etc.

OBJECTS OF THE INVENTION

Persons performing tasks resulting in eye, head, or body movements will experience normal occulo-vestibular reflex input which will affect any ballistic movement or judgment of movement. Well trained athletes can learn to suppress these reflexes to perform practiced maneuvers or ballistic movements, such as striking a golf ball, free throwing a basketball, throwing a bowling ball, etc.

It is a general object of this invention to diminish the input from the occulo-vestibular reflexes of the athlete or sportsman and provide immediate visual feedback concerning alignment while he or she is performing any motor coordination skill or movement. This is accomplished by providing the wearer of eyeglasses embodying this invention with immediate visual feedback which through repetitive performance or practice will train the wearer to either keep his or her head and eyes still or limit linear and/or rotational movement to one plane. The alignment eyeglasses will allow the wearer to keep the target or target line in the same position in the wearer's visual field for each repetition. Any movement in the visual field or of the visual field will be instantly apparent to the wearer. This allows more precise performance of the designated task.

Eyeglasses embodying this invention are especially adapted for use by participants or trainees in various sports, such as golf, basketball, baseball, bowling, running, tennis linesman, etc., which require correct alignment of the body, head, limbs and/or a held article, e.g. a basketball, a bowling ball, etc.

The eyeglasses may be especially designed for use by golfers to provide a visual reference line for the purpose of keeping the head in proper position for the golf swing and providing alignment information in preparation for the shot.

It is important for a golfer to keep the head steady or as immobile as possible during the swing, both backward and forward. An object of this invention is to enable a golfer to observe whether or not the head is steady and if not to make appropriate corrections.

Further, golfers sometimes when in position to strike the ball, i.e. at address, are not correctly aligned with the target, i.e. the direction in which the golfer desires the ball to go. An object of this invention is to allow the golfer to easily check that alignment and to make adjustments, i.e. reposition the feet if necessary, to achieve correct target alignment.

Still further, golfers at address sometimes are not correctly or desirably positioned as respects the location of the ball between the golfer's feet. Sometimes the ball is positioned too far ahead, i.e. toward the target, or too far back. An object of this invention is to allow the golfer to easily check that position of the ball and to make an adjustment, i.e. reposition the feet if necessary, to achieve the desired location or position of the ball in the golfer's stance.

The eyeglasses may also be especially designed for use by basketball players during a free throw to provide a reference point to focus the wearer's attention prior to shooting or throwing the ball and to provide directional alignment for the player's head and body during the shot. These eyeglasses also can be used by a participant in any sport requiring the throwing of an object, e.g. a baseball, a football, etc., from a stationary position.

The eyeglasses may also be especially designed for use by baseball batters to properly position the head when attempting to hit a pitched ball. The eyeglasses will keep the batter's eyes in the proper alignment and help provide immediate feedback when he moves his head away from the plate or strike-zone.

The glasses may be especially designed for use by bowlers to provide directional information to the bowler as he or she approaches the line across the bowling lane to release the ball.

The eyeglasses may also be especially designed for use by runners to show proper positioning of the runners head, help the runner move in a straight path between two points, and provide immediate feedback to help the runner keep his head and body from having excess movement. The eyeglasses will also provide a focal line to concentrate upon and aid in movement of arms, legs and feet in a straight path.

The eyeglasses may also be especially designed for a tennis linesman to help the linesman focus his attention on the line that he is responsible to judge.

Other uses of the eyeglasses embodying this invention will become apparent to those skilled in the art.

BRIEF SUMMARY OF THE INVENTION

The aforesaid objects are accomplished by providing eyeglasses of any conventional type, even clip-ons, having left and right transparent eyepieces on either or both of which there are one or more substantially straight visible transparent lines that provide the illusion of the lines being superimposed on the view through the lines.

Preferably the line or lines are parallel to and displaced from or pass through the horizontal and/or the vertical axis of the eyepiece. The horizontal axis of an eyepiece may be defined as an imaginary line extending horizontally, that is when the eyeglasses are worn by a person with the head in an upright position, through the optical center of vision or visual axis of the eyepiece, i.e. when the wearer is looking straight ahead. The vertical axis of an eyepiece also may be defined as an imaginary line extending vertically through the optical center of vision or visual axis of the eyepiece when the eyeglasses are worn by a person with the head upright. The lines preferably are continuous but may be discontinuous, such as dash or dot-dash, so long as the objective or objectives are achieved. They also desirably extend from side to side or from top to bottom of the eyepiece, but may be somewhat shorter so long as the foregoing objective or objectives are achieved. The lines preferably also are of measurable width, preferably not exceeding 1/16th", i.e. about 1.6 mm, and transparent while the areas of each eyepiece unoccupied by the lines also are transparent and substantially uncluttered by any distracting indicia or other obstructions to vision.

Still further, the lines are placed on or substantially on only one surface of an eyepiece, i.e. either the front or on the back, in order to eliminate possible overlapping of the lines so that a view therethrough possibly would include both edges of each line, i.e. four edges in all, a distracting and confusing situation. The lines also are created by an improved simple process which produces the lines described above.

Other uses and objectives of this invention will become apparent from the following detailed description and accompanying drawings in which:

BRIEF DESCRIPTION OF THE DRAWINGS

FIG. 1 is a perspective rear view of eyeglasses especially designed for use by golfers having left and right eyepieces provided with transparent visible lines thereon embodying this invention.

FIG. 2 is a rear view corresponding only to the eyepieces of FIG. 1 but showing a modification of the invention for use by golfers.

FIG. 3 is a view corresponding only to the eyepieces of FIG. 1 showing another modification of the invention especially designed for use by golfers.

FIG. 4 is a view corresponding only to the eyepieces of FIG. 1 showing a further modification of the invention especially designed for use by golfers when putting.

FIG. 5 is a view corresponding only to the eyepieces of FIG. 2 showing a modification of the invention especially adapted for use by basketball players and runners.

FIG. 6 is a view corresponding only to the eyepieces of FIG. 2 showing a modification of the invention especially adapted for use by bowlers. This modification also can be used by a tennis linesman.

DETAILED DESCRIPTION OF THE INVENTION

Figure 7:
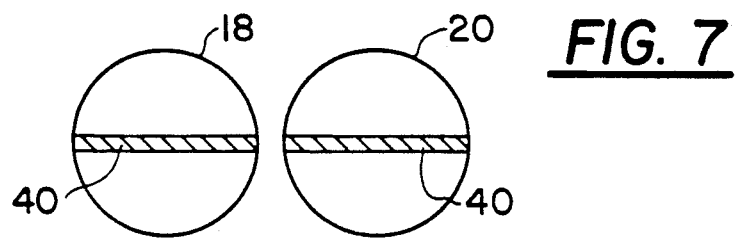
FIG. 7 is a view corresponding only to the eyepieces of FIG. 2 showing a modification of the invention especially adapted for use by baseball batters.

Referring now to FIG. 1 of the drawings, there is shown eyeglasses 10 having the usual frame 12 with a nose piece 14 and temples 16. Held in the frame 12 are left and right transparent eyepieces 18 and 20 which may be corrective, i.e. prescription lenses, or non-corrective, i.e. plain lenses. The eyepieces 18, 20 may be formed of any suitable substantially transparent material, such as glass, plastic, polycarbonate or the like. The frame 12 is shown for illustrative purposes only and the eyepieces 18, 20 may be held by any type of eyeglasses arrangement including that which can be clipped onto conventional eyeglasses.

The eyeglasses 10 shown in FIG. 1 is especially designed for use by golfers. Thus, in the left eyepiece 18, displaced below but parallel to the horizontal axis thereof, indicated by the line H—H, there is a straight visible transparent line 22 which preferably extends from side to side of the eyepiece.

The visible line 22 is intended to be visible to the golfer when looking therethrough so that the line appears to be superimposed on the view through the left eyepiece 18 when looking through the line. The visible line 22, or any of such other comparable lines described hereinafter, preferably is formed as follows. The eyepiece 18 has a base of clear material, e.g. CR39 plastic, into which the pigment of tinting material can penetrate or be absorbed. The back or concave surface of the eyepiece is masked so that tinting material will be absorbed only on the front or convex surface of the eyepiece. A masking strip (not shown), corresponding to the line 22, is placed on the front surface of the eyepiece 18 and then the eyepiece is tinted. After the eyepiece 18 has been tinted the back mask and the front masking strip are removed to disclose clear material that together with the front tinted areas defines the line 22. After removing the front masking strip but before removing the back mask, the line 22 may also substantially be lightly tinted, e.g. yellow, which may draw the eye more readily thereto. The line 22 may be applied to the rear surface of the eyepiece instead of the front in which case the front surface is masked completely and the masking strip applied to the back surface.

The preferred specific process for making the line 22, or any of the other comparable lines described hereinafter, is to make the eyepiece of CR39 plastic material and to use as the tinting material a water-soluble dye of any desirable color. In actual practice, the color black results in a gray tint in the eyepiece. The masking strip which defines the line is made of non-water-soluble liquid, e.g. ink, which is soluble in other solvents. The masking liquid is first applied to a pattern (not shown) having a surface complementary to the surface of the eyepiece to which the line is to be applied. In the pattern is an incised groove corresponding to the line and about 1/1000" in depth. The masking liquid is applied to the pattern and wiped off leaving the liquid only in the groove. A pad (not shown) having a surface complementary to that of the pattern is applied to the pattern and the liquid is transferred to the pad. The pad is then carefully and precisely applied to the desired surface of the eyepiece using a fixture or jig (not shown) to properly align the two and the line of masking liquid is transferred to the surface of the eyepiece and dried to form the masking strip.

The eyepiece is then soaked for 20 or 30 minutes in an aqueous bath containing the water-soluble dye and heated to slightly below boiling, e.g. about 200° F. The dye then penetrates the unmasked surfaces of the eyepiece to a depth of about only a small fraction of a millimeter. On removal from the bath the masking strip and the mask on the other surface of the eyepiece, which may also be of the same masking liquid as the masking strip, are removed from the eyepiece with an appropriate solvent to define the line.

Preferably only one surface of the eyepiece, i.e. either front or back, is tinted to define the line for two reasons. The first is that the eyepiece is about 3.2 mm thick, much more than the penetration depth of the tinting material. Thus, if the line was defined on both front and rear surfaces of the eyepiece, a wearer probably would see two overlapping lines, and all four side edges thereof, when the eyepiece is not in a specific exact position on the wearer, a distracting condition not conducive to correct alignment. The second is that it would be most difficult to form lines on both front and rear surfaces in absolutely correct alignment but even so the probability of seeing two overlapping lines would remain. If the eyepiece 18 is clear to begin with, masking material to define the line may be applied in two separated parts to leave a visible line therebetween which then is shaded in the tinting process. When the masking material is removed, there is simply a tinted or shaded line 24 between two clear parts, as shown in FIG. 2.

Desirably, the visible line 22, or any other comparable visible lines described hereinafter, is of measurable width, not more than about 1.6 mm, preferably only about 1 mm. If much wider only one of the two edges of the line superimposed on the view therethrough would be used by the wearer of the eyeglasses for alignment purposes. Thus, the wearer would need to choose between the two edges. An undesirable condition.

Whether the major areas of the eyepieces 18 and 20 are tinted or darkened as shown in FIG. 1 or clear as shown in FIG. 2 will depend on the intended usage of the eyeglasses embodying this invention. If the user normally wears dark glasses or sunglasses for a particular activity at a particular location, then the major areas of the eyepieces will be tinted or dark, and vice-versa.

A particular advantage of this invention is that the darkened areas of the eyepiece are made by tinting which penetrates into the surface of the eyepiece. Thus, light striking the rear surface of the eyepiece is not reflected into the wearer's eye as in the case when the darkened areas are formed by a coating. The absence of reflections eliminates the necessity of "blinders" on the temples 16, as disclosed in the patent to Sparks et al described hereinafter.

The displacement of the line 22 below the horizontal axis of the eyepiece 18 may be varied slightly depending usually upon the height of the golfer. A relatively short golfer need not incline his head very much at address to look directly at the golf ball (not shown), while a rather tall golfer usually must incline his head to a greater extent at address to look directly at the golf ball. On the other hand, it has been found in actual practice that a displacement of the line 18 of about 8 mm below the horizontal axis H—H is in a position so that a golfer looking therethrough has his or her head in an ideal position for all strokes or shots but that of putting. In that preferred position on the eyepiece 18 the line 22 normally will not be seen by the wearer who usually will be looking through the optical center of the eyepiece 18. That 8 mm displacement may be varied slightly, however, to accommodate very short or tall golfers as mentioned above.

After addressing the ball and looking directly thereat through the visual axis of the eyepiece 18, the golfer then raises his head so that the line 22 apparently passes directly through the golf ball and along the ground. This indicates the direction in which the ball will go when it is struck by the golfer. That extended apparent line 22 thus indicates to the golfer whether the line is pointing in the correct direction, i.e. at the target. If not, the golfer makes necessary adjustments to properly align his feet so that the line 22 does point or extend in the necessary or intended target direction. In a somewhat reverse procedure, the golfer initially, by head movement, may align the line 22 with the ball and target direction and then adjust his feet to maintain that correct target direction during the swing.

Referring again to FIG. 1 of the drawings, on the right eyepiece 20 there is a straight visible transparent line 28, in width and application like the line 18, which is parallel to the vertical axis of the eyepiece, indicated by the line V—V, displaced from that axis toward the nasal side of the eyepiece and preferably extending from top to bottom thereof. Of course, the vertical line 28 on the eyepiece 20 of this invention may be formed instead like the vertical line 30 in FIG. 2, i.e. in the same manner as the horizontal line 24, as a tinted or shaded line between two clear sections.

The vertical visible line 28 or 30 is also used by the golfer by slightly turning his head to the right at address so that it passes directly through the ball, an ideal position of the head for the beginning of all but putting strokes. This will aid the golfer in determining where the ball lies with respect to the distance, i.e. along the line, between his feet. If the ball is either ahead or behind the desired position, the golfer can make the necessary adjustments, i.e. with his feet, to achieve the desired position of the ball in the golfer's stance. This vertical line 28 or 30 also aids the golfer in checking whether or not he is in a correct upright or substantially vertical position at address so that his body is not canted excessively to one side or the other.

Still further, the line 28 or 30 will indicate to the golfer during the swing whether or not the head has moved so that if necessary the golfer can correct or eliminate such movement and make a more determined effort to keep the head still, a very important factor in striking the ball squarely.

Attempts have been made heretofore to provide eyeglasses that will aid a golfer in keeping the head steady during the swing. Thus, the patent to McMurdo U.S. Pat. No. 2,045,399 discloses tinted or colored eyeglasses having in the left or both eyepieces a clear segment in the left hand side of the eyepiece. The instruction is that at address the golfer sees the ball through the colored area of the eyepiece, then he turns his head to the right before commencing the swing, and the ball appears in the clear space or spaces and should remain there during the swing, provided the golfer keeps his head still. Although the clear spaces are defined by one or more straight lines, i.e. the boundary between the colored and clear areas, these are not used specifically as focus points to keep the head steady. Aside from the fact that the McMurdo lines have no measurable width, they mostly are so short that they cannot serve the alignment functions of the lines of this invention. In only one McMurdo embodiment (FIG. 2) is there defined a straight vertical line long enough to serve an alignment function. But this line is in the left eyepiece for the non-dominant eye and apparently passes through the visual axis. Thus, this line alone is of small use for a golfer. Moreover, the clear area 15 of McMurdo FIG. 2 is so large, in comparison with the size of the golf ball viewed therethrough, that the clear area is of little use in aiding a golfer to keep the head steady.

Another patent, to Novack U.S. Pat. No. 3,268,228 discloses eyeglasses purportedly of use to a golfer in keeping the head still during the swing. Novack, like McMurdo FIG. 2 shows small clear segments in both eyepieces, but the remaining areas of the eyepieces are opaque so the eyeglasses must be removed after the swing to enable the golfer to see sufficiently to be comfortably mobile.

Still another patent to Underhill U.S. Pat. No. 3,871,104 discloses eyeglasses having cross-hairs in both eyepieces which, however, are hollow and contain a non-transparent liquid the upper level of which registers precisely with the horizontal cross-hair of the corresponding eyepiece when that cross-hair is horizontal. The eyeglasses are intended to be a substitute for two tools, i.e. the usual carpenter's bubble level for horizontal leveling and a plumb bob to determine vertical lines. These eyeglasses would be of little use to a golfer.

Still another patent to Sparks et al U.S. Pat. No. 4,824,234, Apr. 25, 1989, discloses eyeglasses for use by a golfer having clear horizontal bands in both dark eyepieces 14, 16 apparently parallel to the horizontal axis of the eyepieces and "disposed approximately midway between the top and bottom of each optical device [eyepiece], respectively" (col. 2, lines 2 et seq.) or "just below a transverse centerline 76" [not shown in the drawings] (col. 4, lines 13, 14). Those are contradictory statements and do not necessarily locate the bands below the center optical axis of the eyepieces or even precisely define the extent of the displacement below the "centerline". Further, the eyepieces 14, 16 are described as having a width of "about ⅛″ to about ¼″ (col. 3, lines 53, 54), much greater than the maximum width of about 1.6 mm for the lines embodying the invention.

Still further the bands 14, 16 of Sparks et al are not described as being applied to only one surface, either front or back, of the eyepieces. Nor does Sparks et al contain any description of how the eyepieces are darkened to define the bands. Further, the darkened areas of Sparks' eyepiece apparently are formed by coatings because he uses "blinders" 80, 83. Of course, the vertical lines 28, 30 of this invention are missing from Sparks et al.

After the aforesaid correct address has been achieved by use of the horizontal and vertical lines, the golfer is in a correct position and correct alignment to strike the ball so it will go in the proper direction and achieve the desired loft because the golfer has placed it correctly as respects his two feet, that is, the distance between the two feet. Further, during the swing, the golfer can more readily keep the head still because of the feedback from the vertical line 28 or 30 which should pass directly through the ball.

Preferably, the angle between the visible lines 22, 28 on the left and right eyepieces 18, 20 is of the order of 90°. The exact location of the visible lines on the eyepieces 18, 20 may vary on different eyeglasses because of differences in pupillary distance and individual preference for where the visual illusion of the lines on the view is desired. While the visible horizontal line 22 preferably is displaced below the horizontal axis H—H and the visible vertical line 28 is displaced from the vertical axis V—V toward the nasal side, such displacement is not essential for some of the functions of the visible lines, i.e. all functions but that of aiding the golfer in keeping his head still. On the other hand, when the eyeglasses 10 are worn continually when a golfer is playing, as normally would be the case with sunglasses or prescription glasses, locating the visible lines at or near the visual axes of the respective eyepieces would place the lines in position to be viewed continually. That probably would be distracting. Accordingly, the above-described displacement from the axes is preferably for golfers or any other activity requiring proper alignment when the glasses are worn continually.

The vertical line 28 is intended for use by the dominant eye of the golfer. If the right eye is dominant the foregoing description is apt for a right handed golfer. However, if the left eye is dominant and the golfer is left handed the positioning of the visible lines 22, 28 or 24, 30 will be reversed with respect to the eyepieces 18 and 20.

Referring now to FIG. 3 of the drawings, there is shown a further modification of the FIG. 1 embodiment especially designed for golfers wherein there are two visible horizontal lines 32, 34 on the left eyepiece 18, both displaced from each other and both preferably displaced below the horizontal axis of the eyepiece. This type of modification can be used to provide eyeglasses that are suitable for both tall and short persons, one of the horizontal visible lines 32, 34 being used, as described heretofore by a tall golfer and the other line being used by a short golfer, to correctly align himself in a target direction and position the ball at the desired position between the feet.

Some glasses used strictly for putting a golf ball or a use requiring some other alignment that is only in the horizontal visual plane may have only one visible horizontal line on one or both eyepieces 18, 20, preferably displaced below the horizontal axis about 8 mm, as shown by the lines 22 and 36 in FIG. 4.

There follows a brief description of embodiments of the invention for use in other sports.

Basketball players during a free throw frequently miss the basket by the ball being to one side thereof, i.e. either to left or right. This usually is caused by the hands being offset vertically on the ball at address and/or by the arms being incorrectly aligned with the basket during the throw, particularly during the last stages of the throw. Referring now to FIG. 5, there is shown an embodiment of this invention having lines made like those of FIG. 2 especially designed for use by the stationary basketball throwers, mainly during practice free throws, to easily check that alignment and to make adjustments or corrections, if necessary, during subsequent throws. In this embodiment, the right eyepiece 20 or the eyepiece for the dominant eye has a vertical visible line 38 thereon which passes through the visual axis of the eyepiece, while the other eyepiece has a horizontal visible line 40 thereon which passes through or near the visual axis of that eyepiece. The horizontal line 40 readily enables the player to check the horizontal alignment of the hands on the ball at address, i.e. just before the throw. If the hands are vertically offset, an adjustment can readily and quickly be made to bring the hands into proper horizontal alignment before the throw. During the last stages of the throw, the vertical line 38 is used to check whether the arms are correctly aligned with the basket and, if not, to align the arms correctly during subsequent throws.

The eyeglasses of the embodiment of FIG. 5 also may be used by runners to achieve the objectives described heretofore of running.

Bowlers frequently or usually miss strikes because the throwing or casting arm is not correctly aligned with the target at ball release or cast. FIG. 6 shows an embodiment having lines made like those of FIG. 2 especially designed to enable the bowler to easily check that alignment and to make corrections or adjustments, if necessary, to achieve correct alignment during subsequent throws or casts. In this embodiment there is a visible vertical line 38 on the vertical axis of the eyepiece for the dominant eye, e.g. the right eyepiece 20, while the other eyepiece 18 is devoid of lines. During the last stage of the throw or cast, the bowling arm of the bowler should be parallel to this line 38 which should be superimposed on the pins. If not, adjustments should be made in subsequent casts to achieve that result.

The eyeglasses shown in FIG. 6 also can be used by a tennis linesman to focus his attention on the line that he is responsible to judge.

FIG. 7 shows an embodiment having lines made like those of FIG. 2 especially designed for us by baseball batters. In this embodiment there are horizontal visible lines 40 on the eyepieces 18, 20 for both eyes. Both lines 40 pass through the visual axis of their respective eyepiece.

These eyeglasses aid the batter to achieve the objectives described heretofore for baseball batters.

Figure 8:
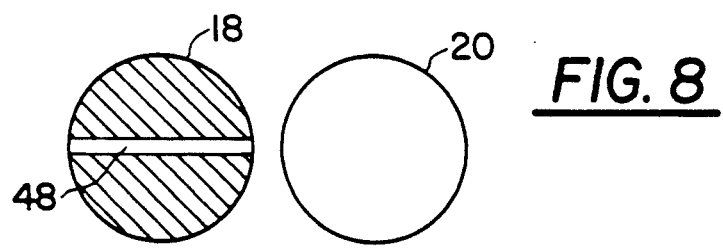
FIG. 8 is a view corresponding only to the eyepieces of FIG. 1 showing a modification of the invention especially adapted for use by typists.

Referring now to FIG. 8 of the drawings, there is shown an embodiment of this invention useful for a purpose different from sports activities, more especially for typists. Typists frequently copy with a typewriter or a word processor line-by-line from material that is printed, typed or script formed. The copier frequently glances from the material being copied to the typed material, i.e. on the paper in the typewriter or appearing on the screen or monitor of the word processor, to check copying accuracy. In so doing, the copier may lose the place in the material being copied. FIG. 8 shows an embodiment of this invention to prevent such losses. This embodiment has a straight visible line 48 on one of the eyepieces extending from side to side and parallel to the horizontal axis thereof. The line 48 is on the left eyepiece 18 as shown, but it may be on the right eyepiece 20 depending on the relative positions of the material being copied and the typewriter or word processor screen. Preferably, the other eyepiece is clear and has no visible line thereon. The horizontal visible line 48 is defined by a clear section between two lightly tinted sections somewhat like the embodiment shown in FIG. 1. In the embodiment of FIG. 9, the width of the line 48 desirably is of the order of the height of the lines of the material being copied when the line 48 is superimposed thereon and may pass through the horizontal axis of the eyepiece or be displaced only slightly therebelow. In any event, the horizontal visible line 48 is preferably so located that when a typist is wearing the glasses and the line 48 is superimposed on the material line being copied, the typist, by lowering the head, can move the visible line 48 step-by-step from one line to the next of the material being copied and so facilitate accuracy of the copying task, i.e. avoid duplication or skipping a line. Further, without moving the head, the typist can glance at the copied material in the typewriter or on the screen to check copying accuracy and then move the eyes back to the same line on the copying material because the horizontal visible line 48 is superimposed thereon. Thus, loss of place is minimized.

It thus will be seen that the objects and advantages of this invention have been fully and effectively achieved. It will be realized, however, that the foregoing specific embodiments have been disclosed only for the purpose of illustrating the principles of this invention and are susceptible of modification without departing from such principles. Accordingly, the invention includes all embodiments encompassed within the spirit and scope of the following claims.

What is claimed is:

1. Eyeglasses having left and right transparent eyepieces, one of said eyepieces having thereon at least one transparent visible straight line of measurable width substantially parallel to and displaced below the horizontal axis of said one eyepiece and extending substantially there across, said line being defined by tinted areas on said one eyepiece on opposite sides of said line and of a shade darker than that of said line, said areas having tinting pigments penetrating to a depth of a small fraction of a millimeter from only one of the front and back surfaces of said one eyepiece, said line appearing to be superimposed on any view through said line and the area of said one eyepiece unoccupied by said line being substantially uncluttered by any obstruction to vision through said area.

2. The eyeglasses defined in claim 1 wherein the width is not more than about 1.6 mm and the displacement is about 8mm.

3. Eyeglasses especially designed for use by golfers having a dominant eye, said eyeglasses having left and right eyepieces, the eyepiece for the dominant eye having thereon a transparent visible line of measurable width substantially parallel to the vertical axis of said eyepiece and displaced toward the nasal side thereof and the other eyepiece having thereon a transparent visible line of measurable width substantially parallel to the horizontal axis of said other eyepiece and displaced therebelow, said lines being defined by tinted areas on the respective eyepieces on opposite sides of the line thereon and of a shade darker than that of said line, said areas having tinted pigments penetrating to a depth of a fraction of a millimeter from only one of the front and back surfaces of the respective eyepiece, said lines appearing to be superimposed on any view through the respective lines and the areas of said eyepieces unoccupied by said lines being substantially uncluttered by any obstruction to vision through said areas.

4. The eyeglasses defined in claim 3 wherein the width of the lines is not more than about 1.6 mm.

5. The eyeglasses defined in claim 4 wherein the width of the lines is not more than about 1 mm.

6. The eyeglasses defined in claim 3 wherein the width is not more than about 1.6 mm and the displacement of the line on the other eyepiece from the horizontal axis is of the order of 8 mm.

7. The eyeglasses defined in claim 3 wherein the pigments penetrate from only the front surface of the eyepiece.

8. Eyeglasses having left and right transparent eyepieces, one of said eyepieces having thereon at least one transparent visible straight line of measurable width substantially parallel to and displaced from the vertical axis to the nasal side of said one eyepiece and extending substantially there across, said line being defined by tinted areas on said one eyepiece on opposite sides of said line and of a shade darker than that of said line, said areas having tinting pigments penetrating to a depth of a small fraction of a millimeter from only one of the front and back surfaces of said one eyepiece, said line appearing to be superimposed on any view through said line and the area of said one eyepiece unoccupied by said line being substantially uncluttered by any obstruction to vision through said area.

9. The eyeglasses defined in claim 8 including another transparent visible line of measurable width on the one eyepiece, defined like the one visible line, substantially parallel thereto, spaced therefrom and disposed below the horizontal axis.

10. Eyeglasses having right and left transparent eyepieces each with intersecting horizontal and vertical axes defining a center of vision at the intersection of said axes, each of said eyepieces having thereon at least one transparent visible straight line of measurable width, not exceeding about 1.6 mm, said line on one of said eyepieces being substantially parallel to the horizontal axis of said one eyepiece and displaced below said horizontal axis and said line on the other of said eyepieces being substantially parallel to the vertical axis of said other eyepiece and displaced from said vertical axis toward the nasal side of said eyepiece, substantially all the areas of said eyepieces unoccupied by said lines being of a shade darker than that of said lines and said lines appearing to be superimposed on any view through the respective line. the displacement of said lines from their respective axes being sufficient to prevent continual viewing of said lines by the wearer of said eyeglasses when looking through the center of vision of said eyepieces. and the area of said eyepieces unoccupied by said lines being substantially uncluttered by any obstruction to vision through said areas.

11. The eyeglasses defined in claim 10 wherein the at least one visible line on the other eyepiece extends substantially from top to bottom thereof.

12. Eyeglasses especially designed for use by golfers having a dominant eye, said eyeglasses having left and right eyepieces each with intersecting vertical and horizontal axes defining a center of vision at the intersection of said axes. the eyepiece for the dominant eye having thereon a transparent visible straight line substantially parallel to the vertical axis of said eyepiece and displaced toward the nasal side thereof and the other eyepiece having thereon a transparent visible line substantially parallel to the horizontal axis of said other eyepiece and displaced therebelow. the width of each of said lines being measurable and not exceeding about 1.6 mm. substantially all the areas of said eyepieces unoccupied by said lines being of a shade darker than that of said lines and said lines appearing to be superimposed on any view through the respective line. the displacement of said lines from their respective axis being sufficient to prevent continual viewing of said lines by the wearer of said eyeglasses when looking through the center of vision of said eyepieces, and the area of said eyepieces unoccupied by said lines being substantially uncluttered by any obstruction to vision through said areas.

13. The eyeglasses defined in claim 10 or 12 wherein width of the lines is from about 1 mm to about 1.6 mm.

14. The eyeglasses defined in claim 10 or 12 wherein the angles between the lines on the left and right eyepieces is about 90°.

* * * * *